Figure 16:
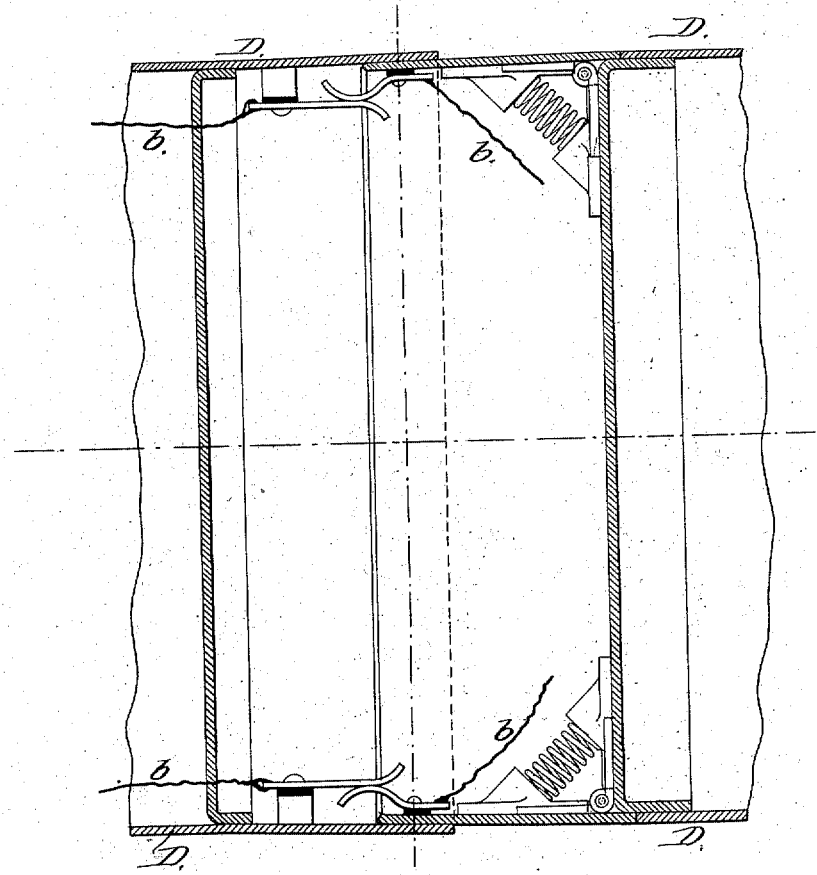

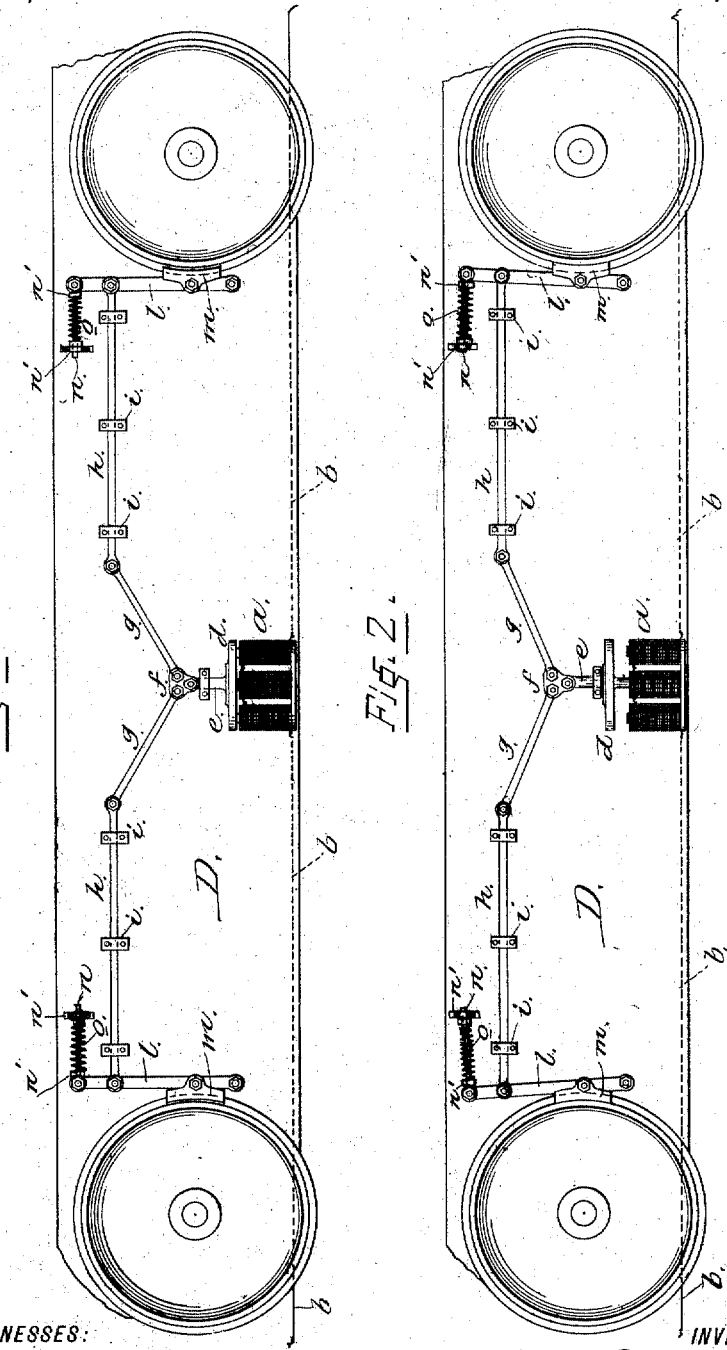

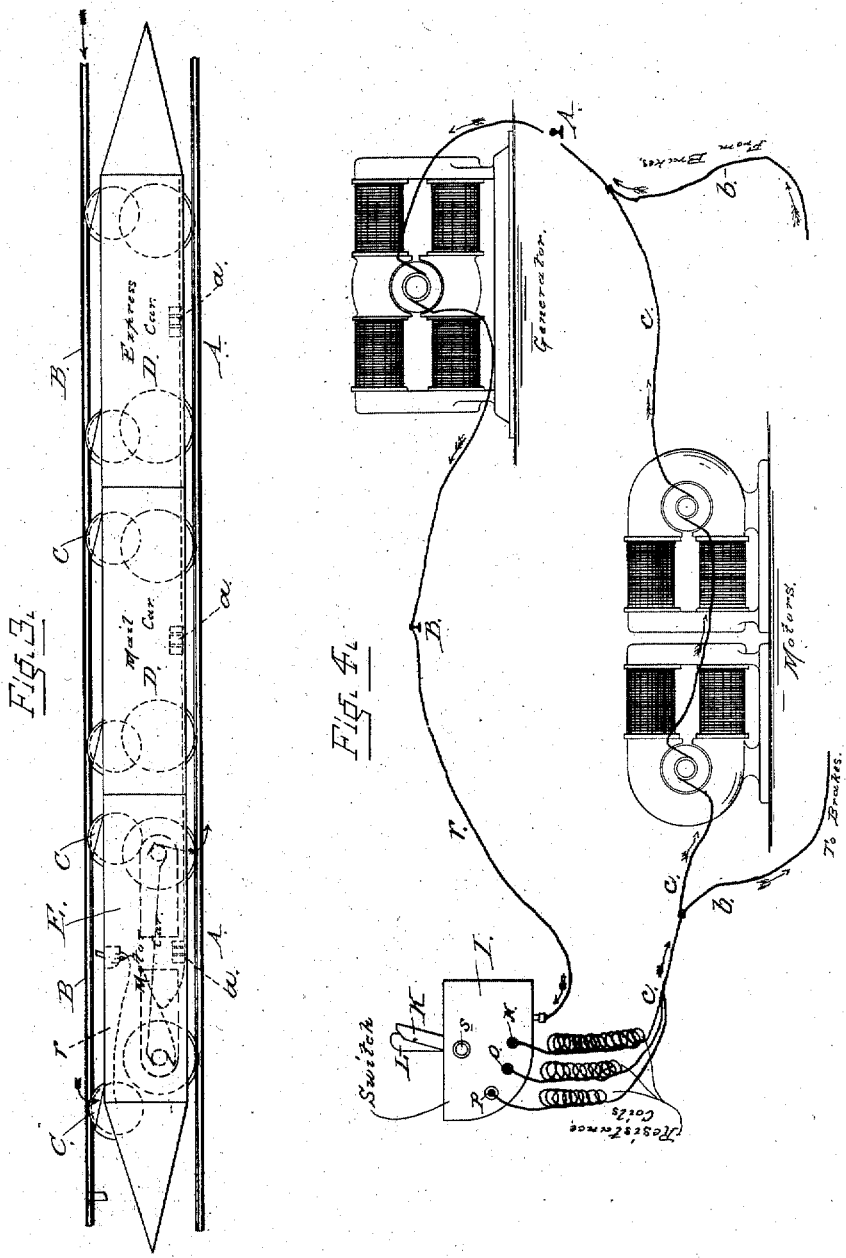

(No Model.) 9 Sheets—Sheet 3.
D. G. WEEMS.
ELECTRIC RAILWAY SYSTEM.
No. 391,394. Patented Oct. 16, 1888.
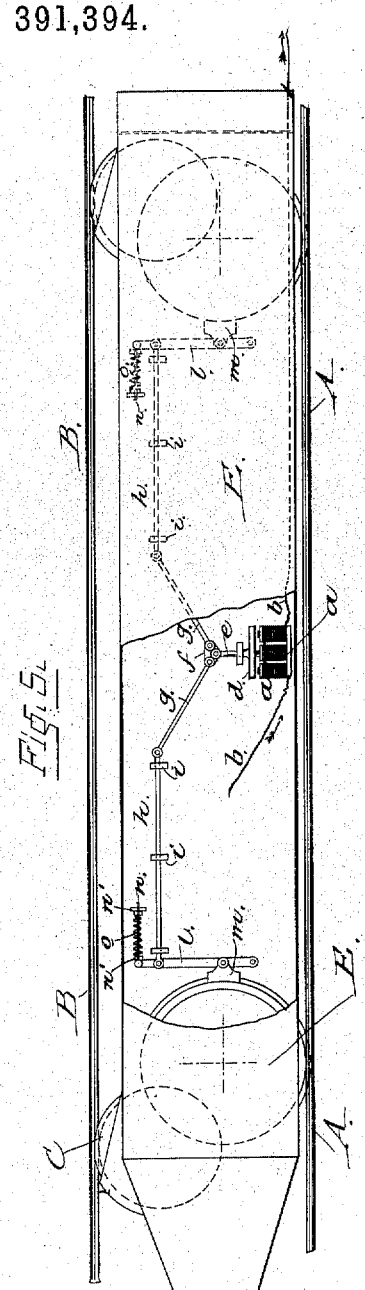
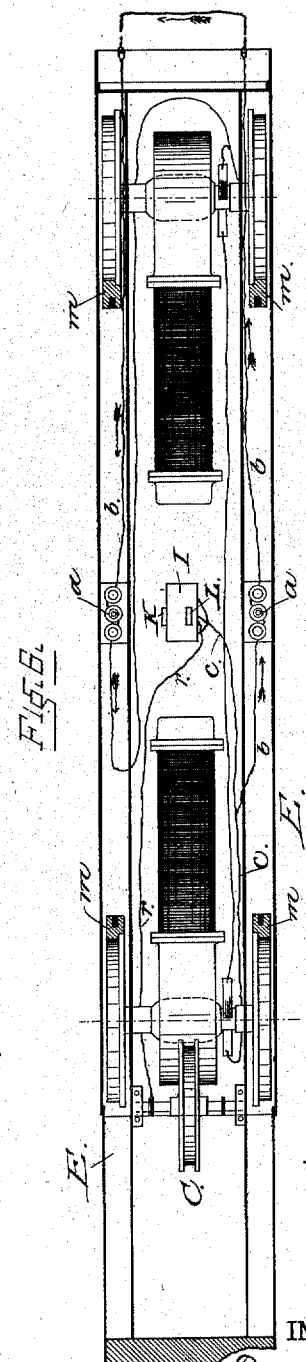
WITNESSES:
INVENTOR:
David G. Weems
BY
A. H. Evans & Co.
ATTORNEYS.

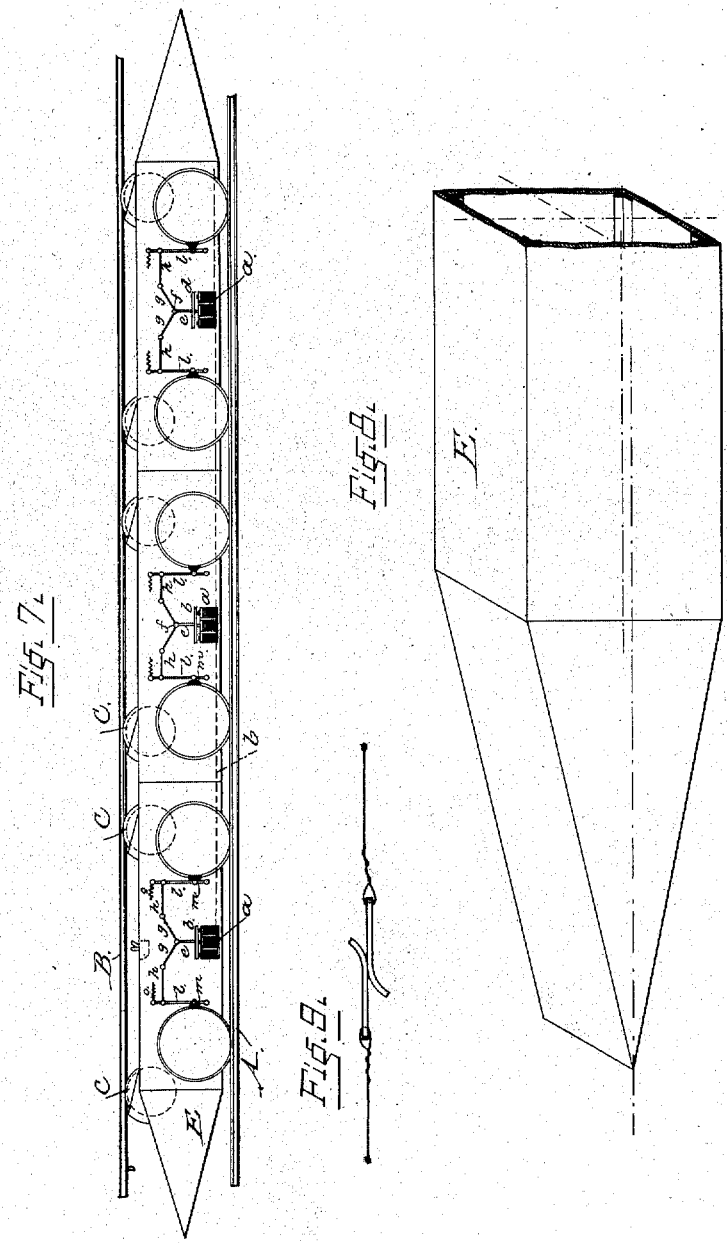

(No Model.) 9 Sheets—Sheet 5.
D. G. WEEMS.
ELECTRIC RAILWAY SYSTEM.
No. 391,394. Patented Oct. 16, 1888.
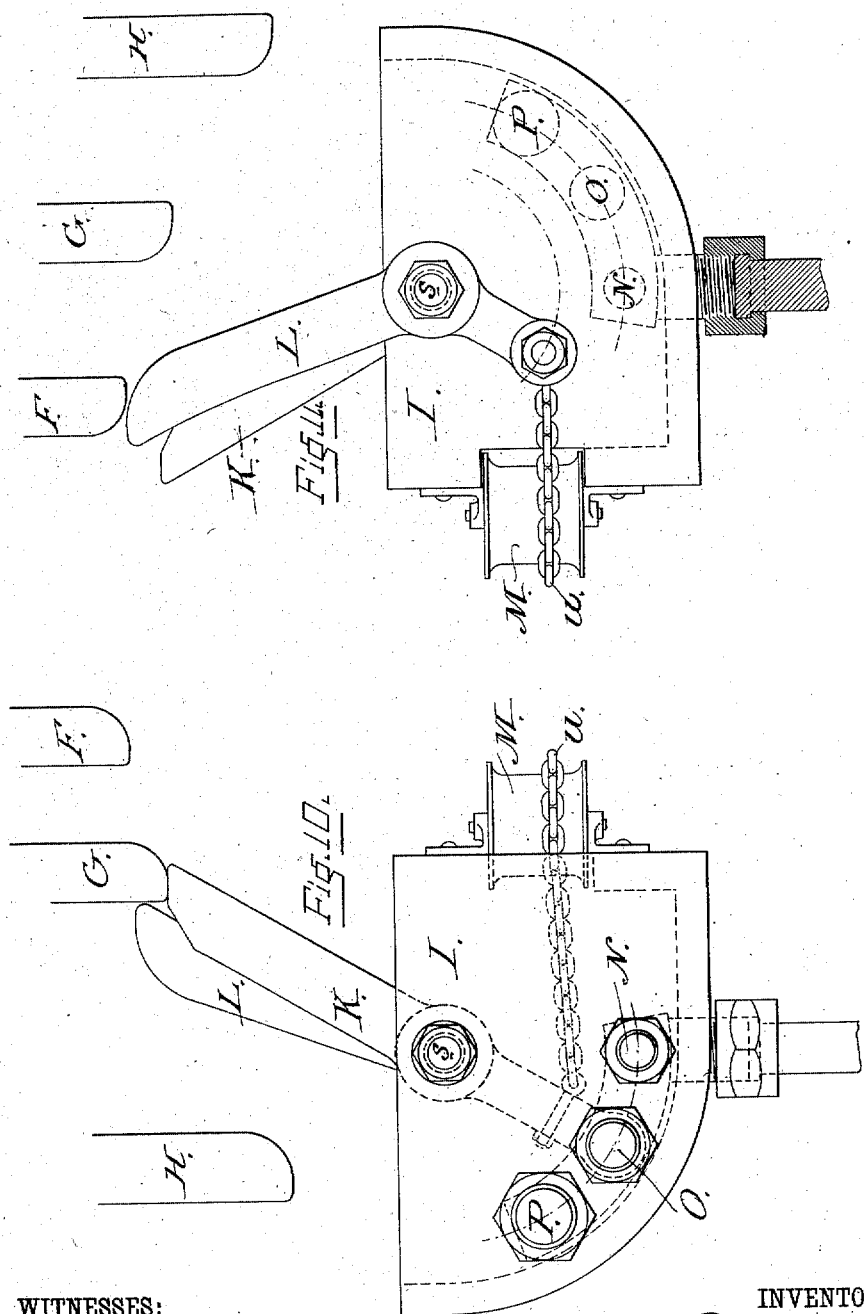
WITNESSES:
Wm. W. Pegram.
Benj. J. Dashiell Jr.
INVENTOR:
David G. Weems
BY
A. H. Evans & Co.
ATTORNEYS.

(No Model.)
D. G. WEEMS.
ELECTRIC RAILWAY SYSTEM.
No. 391,394.  Patented Oct. 16, 1888.
9 Sheets—Sheet 6.
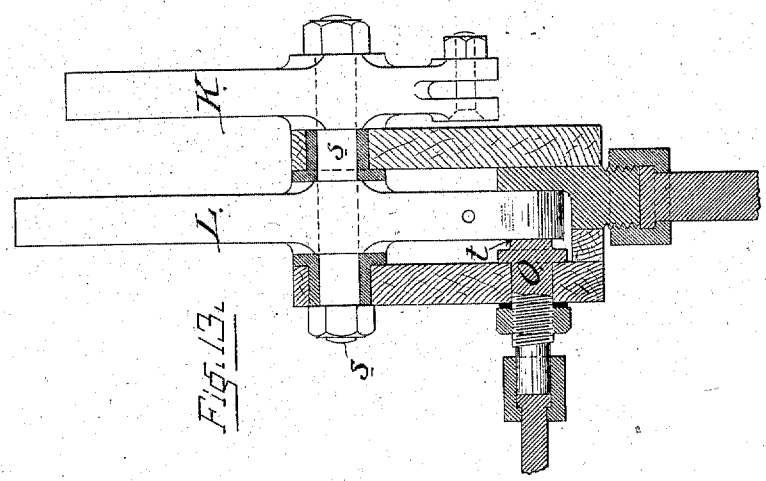
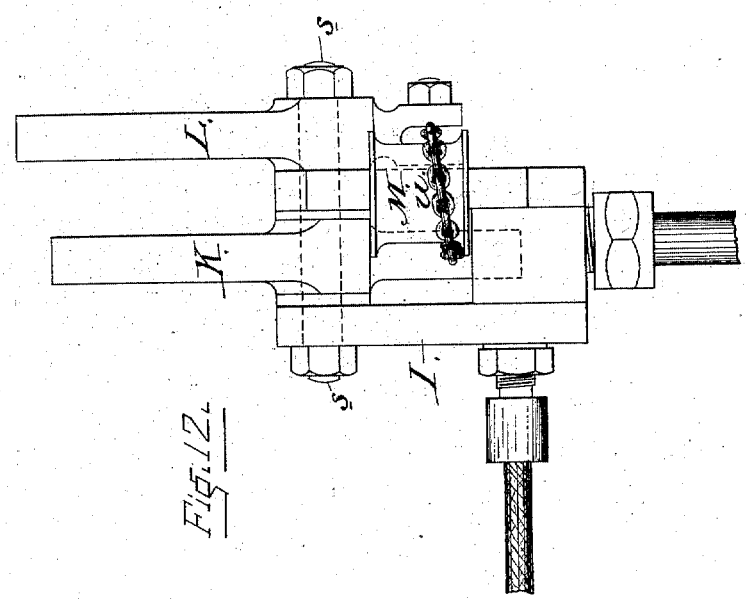
WITNESSES:
INVENTOR:
BY
ATTORNEYS.

(No Model.) 9 Sheets—Sheet 7.
D. G. WEEMS.
ELECTRIC RAILWAY SYSTEM.
No. 391,394. Patented Oct. 16, 1888.
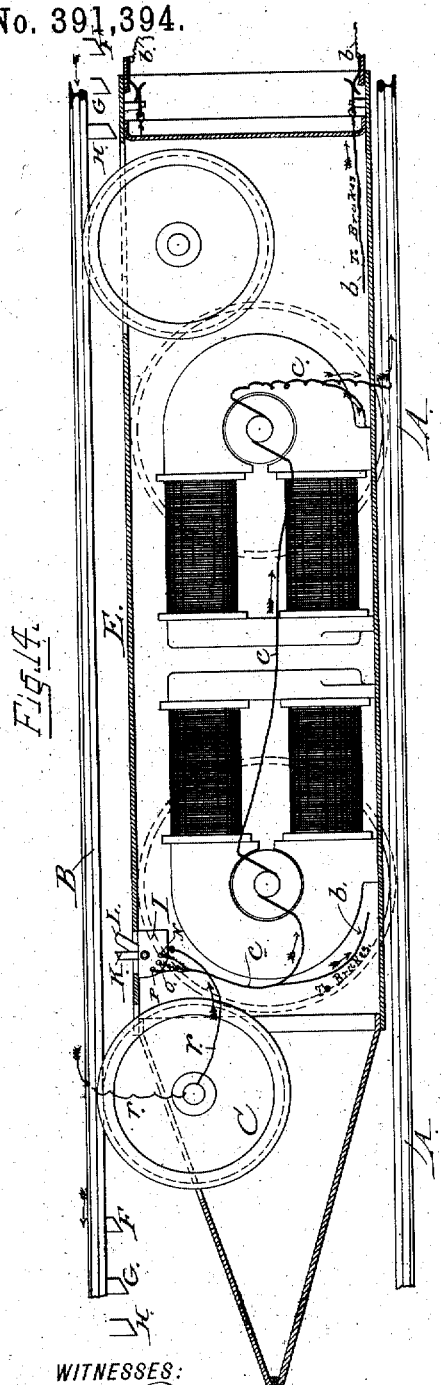
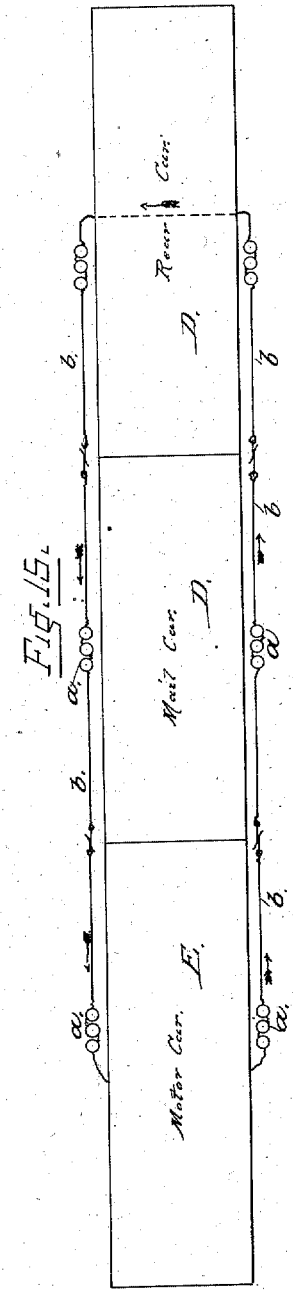
WITNESSES:
S. W. Fowler,
W. H. Patterson.
INVENTOR,
David G. Weems,
BY
A. H. Evans & Co.
ATTORNEYS.

(No Model.)  
9 Sheets—Sheet 8.

D. G. WEEMS.
ELECTRIC RAILWAY SYSTEM.

No. 391,394. Patented Oct. 16, 1888.

WITNESSES:  
INVENTOR,  
BY  
ATTORNEYS.

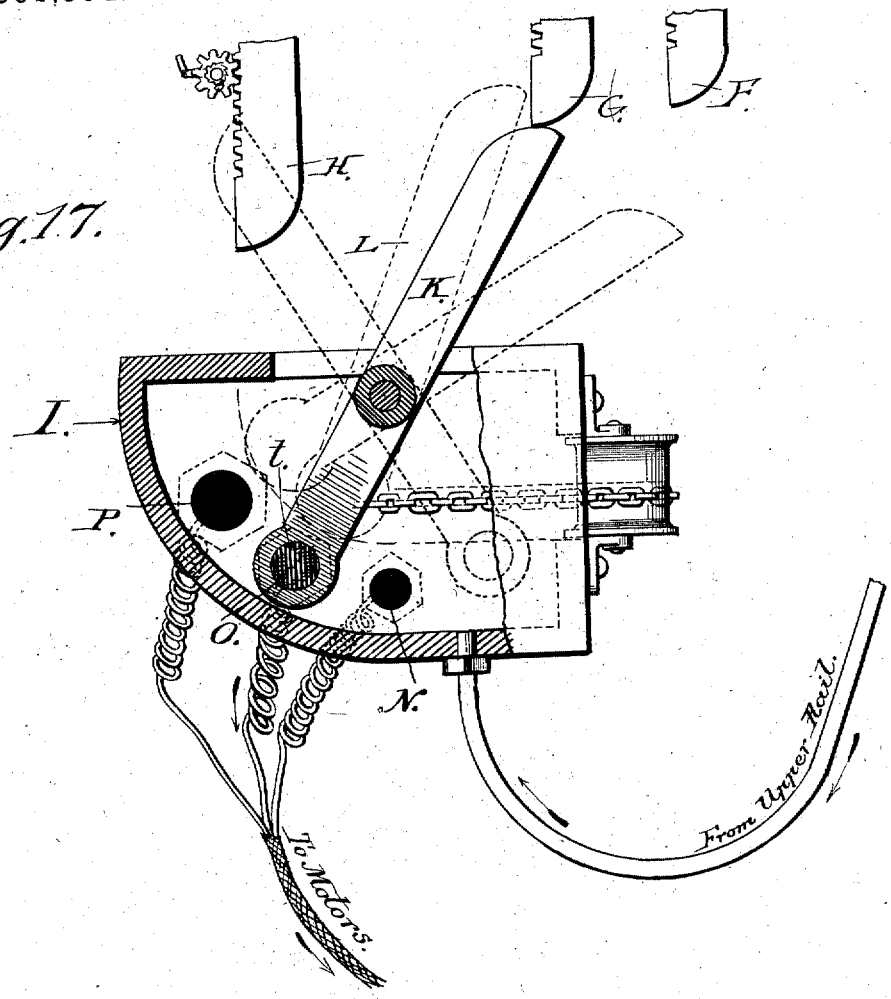

UNITED STATES PATENT OFFICE.

DAVID G. WEEMS, OF BALTIMORE, MARYLAND.

ELECTRIC-RAILWAY SYSTEM.

SPECIFICATION forming part of Letters Patent No. 391,394, dated October 16, 1888.

Application filed June 5, 1888. Serial No. 276,124. (No model.)

*To all whom it may concern:*

Be it known that I, DAVID G. WEEMS, a citizen of the United States, residing at Baltimore city, State of Maryland, have invented certain new and useful Improvements in Electric-Railway Systems, of which the following is a full and clear description, reference being had to the accompanying drawings, forming a part of this specification, in which—

Figure 1 represents a side elevation of a car having its front and rear end broken away and showing the brakes released. Fig. 2 is a similar view showing the brakes applied. Fig. 3 represents a train of cars coupled together and showing in dotted lines the manner of transferring the electric current from the upper electrically-charged guide-rail to the motor and to the magnet for operating the brake mechanism on the forward car. Fig. 4 is a diagram representing one of the housings for the switch-levers, and showing the wires leading therefrom to the motors on the forward car, and showing other wires leading from said motors to a suitable generator and from said generator back to the housing, whereby the circuit is completed, the said figure showing also the branch wires, which extend from the main wires to and from the brake mechanism. Fig. 5 is a side elevation of one of the cars, with a portion of its casing broken away to show internally-placed bearing-wheels and brake mechanisms. Fig. 6 is a horizontal sectional view of Fig. 5, showing the wires connecting the brake mechanisms returning on the opposite side of the car. Fig. 7 illustrates a train of cars, with the bearing-wheels and brake mechanisms on the outside thereof. Fig. 8 is a detail illustrating the wedge-shaped front end of the locomotive or the rear end of the rear car. Fig. 9 is a detail illustrating the brass plates connecting the current-conducting wires to the brakes, which come in contact on the coupling of the cars together. Fig. 10 is an enlarged detail showing one side of the housing and the levers by which the amount of current passing from the upper electric rail to the motor on the locomotive is automatically controlled. Fig. 11 is an elevation of the opposite side of the housing and levers. Fig. 12 is a rear elevation of said housing and levers. Fig. 13 is a sectional view of the same. Fig. 14 is an enlarged view illustrating more fully the manner of transferring the current from the upper electric rail to the motor, and showing also the stops along the line of road by which the switching-levers are operated to increase or decrease the amount of current passing to the motor. Fig. 15 is a sectional view showing the points of contacts between the meeting ends of the cars. Fig. 16 is an enlarged sectional view showing in detail the compressible meeting ends of the cars, the brass plates or contacts and the wires connected therewith. Fig. 17 is a sectional view of the housing, showing the contacts, the levers, the conductors leading from the housing to the motor, and the wire which conducts the current from the upper rail to the housing, said figure also showing the stops and a means for adjusting the same.

My invention relates to certain additional improvements in electric-railway systems for transporting mail, express-packages, &c., at a high rate of speed over a line of elevated, surface, or underground tracks or rails, using as a motive power electricity, having the motor or motors located in a traveling car or locomotive to which a series or train of cars is attached, the said train being supplied with means for controlling, starting, and stopping itself.

The object of my invention is to improve the system illustrated, described, and claimed in my former patent, No. 376,567, granted to me January 17, 1888, on which, and the applications, Serial Nos. 267,802 and 271,290, filed by me March 20, 1888, and April 20, 1888, respectively, the present constructions are improvements; and my present invention consists in the constructions and combinations of devices, which I have hereinafter fully described and claimed.

To enable others skilled in the art to make and use my invention, I will now describe its construction and indicate the manner of carrying the same out.

Referring to the drawings, Figs. 3, 5, and 7, A represents the lower bearing-rails, and B the upper electrically-charged rail, which I preferably use as a guide-rail for the guide-wheels C, as more particularly described in my former application, filed March 20, 1888, Serial No. 267,802, before mentioned, the said guide-rail being in electric connection with one or more dynamos permanently located at one or both terminals of the road, and also with dynamos at points intermediate thereof, if desired.

The cars D in the present case are similar to those shown and described in my application filed March 20, 1888, Serial No. 267,802, being so constructed that when a number of cars are coupled together the entire train presents a practically unbroken surface on all sides, thereby reducing to a minimum the friction incident to the rapid travel of the train. Therefore I deem it advisable to provide the cars with the compressible wings or ends shown in my former application, filed March 20, 1888, Serial No. 267,802, thereby adapting the end of one car to telescope with the meeting end of the car to be coupled. The locomotive E in the present instance I prefer, however, to construct as shown in Fig. 8—that is, of a practically square cross-sectional configuration—the front end in this case being wedge shaped, instead of conical, with its extremity in a plane below the longitudinal center of the locomotive, whereby it not only effectually displaces the air when the train is in motion, but also, by reason of the increased area of its upper inclined surface, the locomotive is more snugly held to the track.

The cars which contain the mail and express matter have by preference a uniform diameter throughout, and the locomotive and cars will be supplied with coupling devices—such, for instance, as those shown in my application filed March 20, 1888, Serial No. 267,802—while the rear end of the rear car will by preference conform to the shape of the front end of the locomotive, as shown in Fig. 8.

The locomotive and each succeeding car is provided with a suitable brake mechanism, which is automatically operated, to check the progress of the train, and by preference this brake mechanism comprises electro-magnets $a$, secured in any suitable positions on the cars and locomotive, and in electric connection with a branch wire, $b$, leading from the main wire, $c$, which conducts the current from the upper guide-rail, B, to the motors.

Contiguous to each of the magnets $a$ is a suitable armature, $d$, having a guide-stem, $e$, which extends above and below the armature, the lower portion passing into the magnet, while the upper portion is formed with a head, $f$, to which the inner ends of rods or pitmen $g$ are pivotally connected, the outer ends of said rods or pitmen being also pivotally connected with horizontally-sliding brake-rods $h$, moving in guides $i$ fixed to the frame of the car and connected at their outer ends to suitable brake-levers $l$, pivoted at their lower ends and carrying brake-shoes $m$, which are adapted to the rim of the supporting-wheels, as shown in Figs. 1, 2, 5, and 7. The upper ends of the brake-levers $l$ are connected with rods $n$, which are mounted in guides $n'$, and between said guides and around the rods $n$ are coiled springs $o$. From the description of this brake mechanism it will be observed that in their normal positions the armature is against the magnet, and the brake-shoes accordingly held away from the rims of the main supporting-wheels, the springs $o$ being depressed. When the current is cut off from the wire $b$ by means which I shall hereinafter describe, the springs $o$ exert their power and force the brake levers and shoes into the positions shown in Fig. 2, the pitmen being straightened out by the movement of the rods $h$ and the armatures lifted out of contact with their magnets. The brake being thus applied, when it is desired to release them it may be readily done by causing the current to again pass through the magnets, the armatures being in turn attracted toward said magnets, the brake-shoes being thereby moved away from the wheels, the brake-levers and rods assuming the positions shown in Fig. 1.

Instead of locating the bearing wheels and brake mechanism on the outside of the cars and locomotive, I may, if desired, locate them within the same, as shown in Figs. 3 and 5, in which latter instance all outside projections are dispensed with, and the resistance incident to externally-located wheels, brake mechanism, &c., is entirely avoided.

A very important feature of the present case is the transferring of the current from the electrically-charged rail to the motors on the locomotive in such quantities that I am enabled to regulate the speed of the moving train at will, or remove the current entirely when the train should be stopped, the desired result in either case being automatically accomplished; and when the mechanisms for effecting these most desirable results are used in connection with any well-known form of switch-board and indicating apparatus at the central station or other place, the location and speed of the train are known to the operator, who at all times has the train or trains under his control. These mechanisms, of which I will hereinafter describe a preferred form, will be used in conjunction with certain adjustable stops, F, G, and H, on the line of road, and these stops may be operated in any suitable manner or may be fixed ones, and numbered to correspond with certain numbers on the switch-board in the operator's room, with which board they may be electrically connected in any well-known manner. While other constructions may be used in carrying out this part of my invention, the construction which I prefer to employ consists of a housing, I, secured by any suitable means preferably to the locomotive, and connected with the electrically-charged rail B by a wire, $r$, leading therefrom, as shown in the diagram, Fig. 4. Between the sides of the housing and mounted upon the bolt or pin $s$ is a lever, K, the lower end of which carries a contact-point, $t$, while the upper portion, which projects above the top of the locomotive, is inclined or beveled at its end, for the purpose of engaging the stops F, G, and H, the said lever being also attached to a second lever, L, upon the bolt or pin s by means of a chain or other connection, u, which passes around a sheave or pulley, M, journaled between brackets secured to the housing, whereby said levers move in unison. The housing is also provided with insulated contact-points N, O, and P, of varying sizes, and from these points wires lead to the main wire, which transmits the current to the motors, as more particularly shown in Fig. 4, the said wires, if desirable or necessary, leading to suitable resistance-coils before joining the main wire. From this description it will be seen that, the current being turned on, it passes to the upper rail and from thence through the guide-wheel to the housing, thence through the lever K, the desired contact, and its wire or wires to the motors on the locomotive, thence from said motor to the bearing-rails in any suitable manner, and is finally returned to the generator to complete the circuit. The train may now be moved by any suitable means until the lever K strikes the first stop or abutment, F. This movement throws the contact-point at the lower end of the lever onto the first contact-point, N, in or on the housing, and transmits current through the wires to the motor, which drives the train at a slow rate of speed. When the lever K meets the next stop or abutment, G, it is moved again until the contact-points t and O come together, when, because of the increased size of the point O, a still greater volume of current is thus permitted to pass to the motor, and when the next stop or abutment meets the lever K it throws it onto the contact-point P, in which latter instance all the current that is required passes from the rail B and is conveyed to the traveling motor, thereby driving the train at a high rate of speed.

I will here state that the stops before mentioned may be located at or near the starting point or station at any station along the line of road, and also at the receiving end of the line; or I may use them in groups or singly, the location of the stops and their arrangement and operation being suited to existing circumstances. In addition to these stops, I will preferably employ a second series of stops similar to the stops F, G, and H, but arrange them in the path of the other lever, L, so that when it is desired to stop the train at any predetermined point or to reduce its speed any one or more of the stops are adjusted so as to trip the lever L and force it backward, thereby drawing upon the chain-connection and moving the other lever back until its contact-point rests upon the desired contact in or on the housing, which reduces the amount of current passing from the electrically-charged rail to the motor; or, if the lever L is moved far enough it will throw the contact-point of lever K entirely clear of the contacts N, O, and P, thereby cutting off the current from the motor, causing the brake to operate and the speed of the train to be checked. I am therefore enabled by the use of the two connected levers, the varying contacts, and the varying or adjustable stops to increase and reduce the speed of the train and to start and stop the train at will.

Having thus described my invention, what I claim as new, and desire to secure by Letters Patent, is—

1. In an electric-railway system in which a train of cars is operated by a current from an electric rail, a series of contact-points of varying resistance and in the motor-circuit a switching-lever adapted to engage therewith, a second lever connected with the first lever, and a plural series of varying or adjustable stops on the line of road and in the path of the switching-levers, whereby increased or reduced currents are automatically transmitted from the electric rail to the motor.

2. In an electric-railway system, the combination of a train of cars having brake mechanism, magnets on the cars for actuating the brake mechanism, the main rails or tracks, an electrically-charged rail, a series of adjustable stops, switching-levers actuated by said stops for transmitting the current from the electric rail to the train, whereby the speed of the latter is controlled, and connections between the magnets and switching-levers.

3. The combination, with a train of cars, an electric motor connected therewith, the main rails, and the electrically-charged guide-rail, of a plural number of switching-levers carried by the train, graduated contact-points in the path of the levers for increasing or decreasing the speed of the train, and automatic brake mechanism on the train in electric connection with the guide-rail, substantially as described.

4. In an electric-railway system in which a train of cars is propelled by the current from an electrically-charged rail, suitable contact-points of varying intensities on the train in electric connection with the electric rail, a switching-lever having a contact-point adapted to move in the path of the varying contact-points, whereby an increased current is transmitted to the train, a second switching-lever connected with the first lever and adapted to reduce or entirely cut off the current from the train, brake mechanisms on the train connected with the varying contacts, and adjustable stops on the line of road for operating the levers, substantially as described.

5. In an electric-railway system in which a train of cars is operated by a current from an electric rail, a suitable motor on the locomotive, and a housing or frame having contact-points N O P, with wires leading therefrom to the motor and to the brake mechanisms, a switching-lever having a contact-point adapted to move in the path of and to engage the contact-points on the housing, a second lever connected with the first lever, and suitable adjustable or varying stops on the line of road for tripping the levers and automatically increasing or decreasing the speed of the train, substantially as described.

6. In an electric-railway system in which the train is propelled by a current from an electric rail, a mechanism for increasing or decreasing the speed of the train, comprising contact-points N O P and their connections between the electric rail and the motor on the train, a switching-lever adapted to be moved into and out of contact with said points, a second lever connected with the first lever, and adjustable and varying stops on the line of road and in the path of the levers, whereby when the switching-lever is moved in one direction or from one contact-point to another the speed of the train is increased and when moved in the opposite direction the speed is decreased, substantially as herein described.

7. In an electric-railway system in which a train of cars is propelled by a current from an electric rail, said train having suitable brake mechanisms, of a mechanism for starting and stopping the train and controlling its speed, comprising contact-points of varying intensities, a switching-lever having a contact-point adapted to engage therewith, a second lever connected with the first lever, moving with it, but in an opposite direction, connections between the varying contacts and the brake mechanisms, and stops on the line of road for tripping the levers, whereby the contact-lever is moved from one point to another to vary the speed of the train, or may be moved out of engagement altogether with the varying contacts, whereby the current is cut off from the train and the brakes automatically applied.

8. In an electric-railway system for transporting mail, express-packages, &c., the lower bearing-rails, the upper guide-rail, the locomotive and succeeding cars, and the means for transferring the current from the upper guide-rail to the locomotive, comprising the housing with its variable contacts and switching-levers, and stops on the line of road for tripping the levers, in combination with brake mechanisms on the locomotive and cars, comprising electro-magnets, armatures attracted thereby to release the brakes, the pivoted pitmen, brake-rods, levers, and shoes, the springs operating against the brake-levers to apply the brake when the armatures are released, and the branch wire leading from the main conducting-wire to the electro-magnets throughout the train, whereby the brakes are applied simultaneously, substantially as described.

9. A locomotive or car of uniform width from end to end and having a square or approximately square cross-sectional configuration, said car having a wedge-shaped front end whose width about equals the width of the locomotive and having the extremity located below the longitudinal center of the car, substantially as herein described.

10. In an electric-railway system for transporting mail, express-packages, &c., the electric rail, and bearing-rails, the locomotive, and means for conveying the current thereto in predetermined quantities, consisting of a housing having graded contact-points, the pivoted lever K, having a contact-point adapted to engage therewith, a second lever, a connection between the two levers, whereby they move in unison, a guide sheave or pulley for connecting the wires leading from the graded contact-points to the locomotive and the brake mechanisms, and the stops on the line of road for tripping the levers, substantially as and for the purpose described.

DAVID G. WEEMS.

Witnesses:
T. WALTER FOWLER,
W. H. PATTERSON.

It is hereby certified that Letters Patent No. 391,394, issued October 16, 1888, upon the application of David G. Weems, of Baltimore, Maryland, for an improvement in "Electric Railway Systems," were erroneously granted to the said David G. Weems; that said Letters Patent should have been granted to *The Electro-Automatic Transit Company of Baltimore City*, as sole assignee of said Weems; and that said Letters Patent should be read with this correction therein that the same may conform to the record of the case in the Patent Office.

Signed, countersigned, and sealed this 23d day of October, A. D. 1888.

[SEAL.]

D. L. HAWKINS,
*Assistant Secretary of the Interior.*

Countersigned:

BENTON J. HALL,
*Commissioner of Patents.*